United States Patent [19]

Granger

[11] Patent Number: 5,125,194
[45] Date of Patent: Jun. 30, 1992

[54] SAFETY SIGN POST WITH BREAKAWAY CONNECTION

[75] Inventor: Mark S. Granger, Worthington, Ohio

[73] Assignee: Marion Steel Company, Marion, Ohio

[21] Appl. No.: 697,175

[22] Filed: May 8, 1991

[51] Int. Cl.$^5$ .................. E04H 12/32; F16B 7/00
[52] U.S. Cl. ........................... 52/98; 52/297; 404/10; 403/2; 403/363
[58] Field of Search .................. 52/88–100, 52/296–298, 720, 721; 404/9–11; 403/2, 312, 363; 40/607

[56] References Cited

U.S. PATENT DOCUMENTS

| | | | |
|---|---|---|---|
| 404,788 | 6/1889 | Kelly | 403/363 |
| 581,593 | 4/1897 | Keller | 403/363 |
| 774,870 | 11/1904 | Ferrall | 403/363 |
| 1,335,302 | 3/1920 | Stout | 403/2 |
| 1,710,842 | 4/1928 | Salustri | 403/312 |
| 1,835,399 | 12/1931 | Hunziker | 402/312 |
| 2,030,550 | 11/1933 | Smith | 403/312 |
| 2,449,056 | 6/1942 | Clark | 403/312 |
| 2,759,574 | 10/1955 | Miller | 52/720 |
| 2,793,719 | 6/1952 | Langerbein | 403/363 |
| 2,887,335 | 11/1955 | Shield | 403/363 |
| 2,950,787 | 7/1958 | Walsh | 40/607 |
| 3,004,637 | 2/1957 | Heintzmann | 403/22 |
| 3,022,100 | 9/1959 | Heintzmann | 403/363 |
| 3,023,862 | 10/1959 | Launay | 403/363 |
| 3,127,870 | 2/1962 | Bieber | 52/98 |
| 3,349,531 | 7/1964 | Wastson | 403/2 |
| 3,521,413 | 4/1968 | Scott et al. | 52/98 |
| 3,521,917 | 6/1968 | King | 403/2 |
| 3,570,376 | 3/1971 | Overton | 52/98 |
| 3,606,222 | 4/1969 | Howard | 52/98 |
| 3,628,296 | 12/1971 | Henry | 52/98 |
| 3,630,474 | 12/1971 | Minor | 52/98 |
| 3,820,906 | 6/1974 | Katt | 403/2 |
| 3,837,752 | 9/1974 | Shewchuk | 403/2 |
| 3,846,030 | 11/1974 | Katt | 403/2 |
| 3,875,720 | 4/1975 | Russell | 52/725 |
| 3,900,269 | 8/1975 | Pavlot | 403/363 |
| 3,912,404 | 10/1975 | Katt | 403/2 |
| 3,912,405 | 10/1975 | Katt | 403/2 |
| 3,967,906 | 7/1976 | Strizki | 403/2 |
| 4,021,977 | 5/1977 | Deike | 52/98 |
| 4,032,248 | 6/1977 | Parduhn et al. | 404/10 |
| 4,105,350 | 8/1978 | O'Donnell | 52/98 |
| 4,126,403 | 11/1978 | Sweeney et al. | 403/2 |
| 4,171,919 | 10/1979 | Willis | 403/2 |
| 4,236,843 | 12/1980 | Chisholm | 403/2 |
| 4,279,530 | 7/1981 | Mullenberg | 403/337 |
| 4,298,292 | 11/1981 | Sweeney | 404/10 |
| 4,435,100 | 3/1984 | Cox | 403/27 |
| 4,435,107 | 3/1984 | Sweeney | 404/10 |
| 4,490,062 | 12/1984 | Chisholm | 403/2 |
| 4,533,277 | 8/1985 | Alexander et al. | 403/312 |
| 4,553,358 | 11/1985 | Deike | 52/98 |
| 4,615,156 | 10/1986 | Deike | 52/98 |
| 4,848,954 | 7/1989 | Wiseman | 403/312 |
| 4,923,319 | 5/1990 | Dent | 403/2 |
| 4,926,592 | 5/1990 | Nehls | 52/98 |
| 4,928,446 | 5/1990 | Alexander | 52/98 |

Primary Examiner—James L. Ridgill, Jr.
Attorney, Agent, or Firm—Dennis H. Lambert

[57] ABSTRACT

A sign post constructed of an upper channel section nested with a lower channel section at a frangible joint designed so when the sign post is struck by a vehicle, failure of the joint will occur in a predictable and consistent manner. The channel sections are preferably formed of stock channel material having a transverse cross-section in the general shape of a hat, including a longitudinally extending flat center web and outwardly divergent side walls. When the channel sections are nested together, the side walls of adjoining sections are in contact with one another, while the web portions remain spaced apart. In the present invention, the channel sections are connected together with a fastener in combination with a spacer that is engaged between the web portions to provide a reliable and strong breakaway connection.

17 Claims, 1 Drawing Sheet

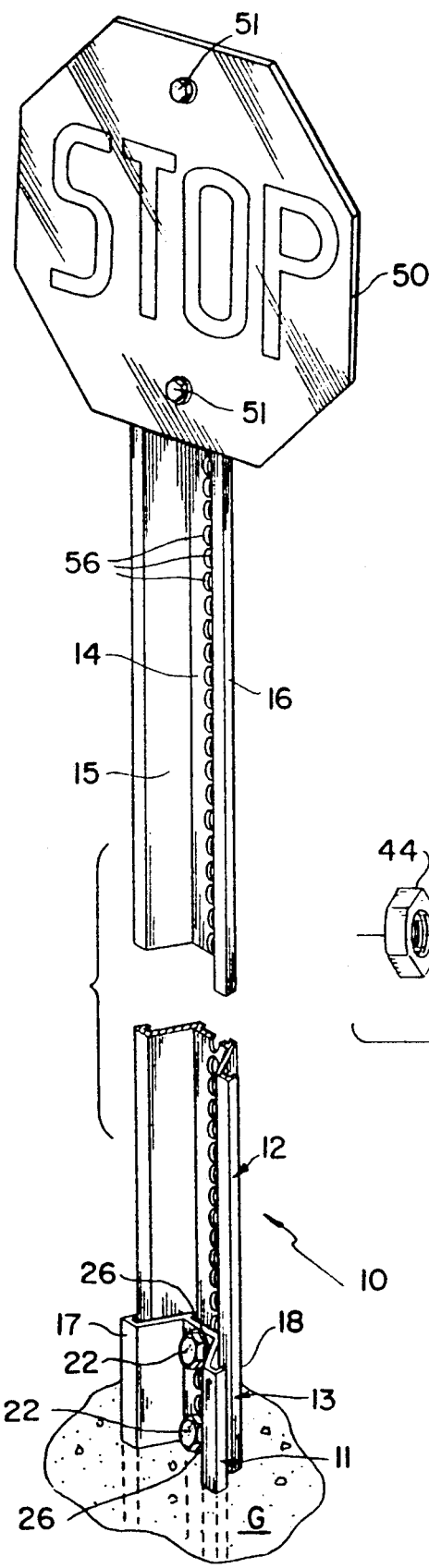
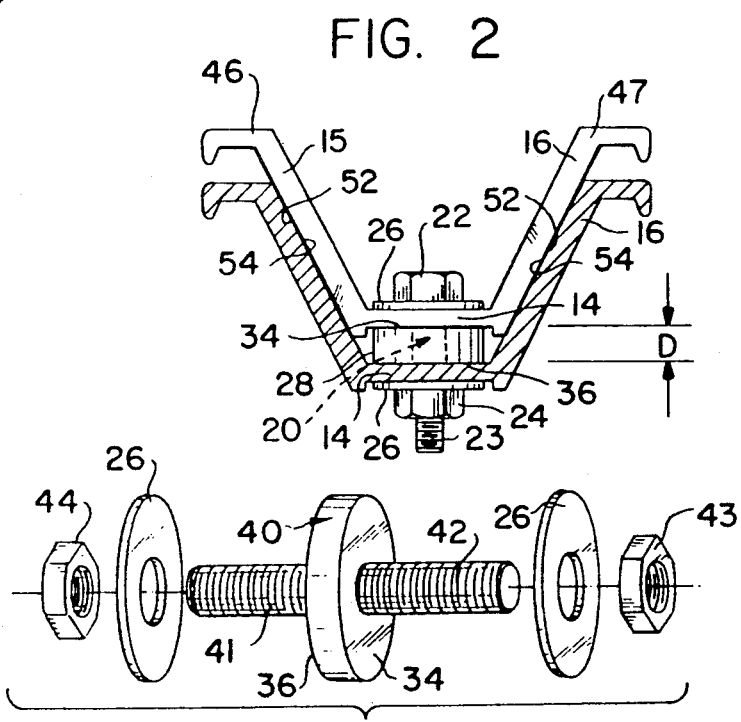
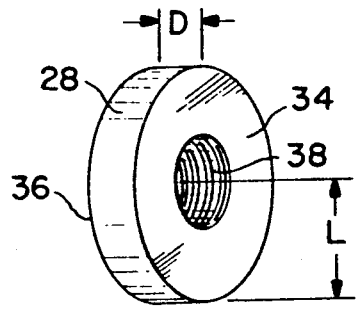

SAFETY SIGN POST WITH BREAKAWAY CONNECTION

BACKGROUND OF THE INVENTION

1. Field of the Invention

This invention relates to a sign post construction that includes a breakaway joint for safety purposes. Specifically, the sign post of the present invention is constructed of a lower channel section, to be anchored in the ground or other substrate, connected to an upper channel section by means of a nested splice connection which breaks under predetermined force.

2. Prior Art

Sign posts of the breakaway variety have been utilized on the roads in the United States for many years. Federal, State and local governments require that sign posts and other structures associated with road construction be of a type specifically designed to ensure the safety of motorists in the event of a collision. Specifically, the Federal Highway Administration (FHWA) sets the standards and oversees the design and construction of safety sign posts on Federal highways.

As determined by tests, and based on years of experience, breakaway sign posts have proved to be highly effective in reducing vehicle damage and preventing severe injury or death to occupants of vehicles that have collided with highway marker signs utilizing safety sign posts.

One particular type of sign post has been used extensively, especially for use with stop signs and other smaller type signs. This post is constructed of steel channel having a hat-shaped cross-section with a flat, longitudinal center web and angularly outwardly divergent side walls. The center web has spaced apart holes along its entire length to allow mounting of a sign to the post at a selected height with one or more suitable fasteners, such as bolts or screws. During installation, the sign post of this type is driven in the ground with a sledge hammer, for example, followed by mounting of a sign to the post by a bolt type fastener.

The hat-shaped cross-section provides sufficient structural strength to allow the post to be driven into the ground. Further, the sign post of this type includes two flat, substantially coplanar edge flanges which provide secure mounting surfaces for engaging with the back of the sign when assembled.

The prior art includes a number of sign posts utilizing the above-described hat-shaped cross-sectional steel post with various types of breakaway connectors. The breakaway connector is typically provided between a section of post driven into the ground and a section of post extending above the ground and supporting the sign. During a collision with a motor vehicle, the section of the sign post above the ground is typically sheared off or hinged over to allow the motor vehicle to continue on its path with minimum damage to the vehicle and/or the absence of injury to the occupants of the vehicle.

Because of the cross-sectional shape of such sign posts, the angularly divergent side walls of the nested together upper and lower channel sections generally contact one another first, while the center webs of adjoining post sections remain spaced apart. This can lead to the imposition of stresses or deformations in the channel sections when they are fastened together by fasteners extended through the webs, resulting in unpredictable behavior of the post, and perhaps failure to break in the intended way when struck by a vehicle.

Moreover, it is difficult and awkward for one person to assemble a sign post from upper and lower sections, as described, since that person must extend multiple fasteners through the lower section, hold the upper section in proper orientation while positioning it over the fasteners, without dislodging the fasteners, and then secure the fasteners by placing and tightening washers and nuts on them, for example, all while holding the upper post section in proper upright position.

SUMMARY OF THE INVENTION

Accordingly, it is a primary object of this invention to provide an improved breakaway type sign post.

Another object of the present invention is to provide a sign post having a nested splice connection with an improved frangible joint.

A further object of the present invention is to provide a sign post having a connection that is at least as strong as the individual channel sections of the sign post.

An even further object of the present invention is to provide a breakaway type sign post connection including a spacer in combination with a fastener.

A still further object of the invention is to provide a spliced connection for sign post sections that facilitates assembly of the sections in the field.

Yet another object of the invention is to provide a spliced, nested connection for sign post sections that includes a spacer and fastener combination which insures consistent and reliable tightening or torquing of the components each time.

These and other objects of the invention are accomplished by providing a sign post with a breakaway connection that performs as designed to reduce the damage to an impacting vehicle and reduce the chance of injury or death to the occupants of the vehicle.

The sign post according to the present invention includes a lower channel section which can be driven into the ground or embedded in some other substrate, such as concrete, during installation. An upper channel section is connected to and extends upwardly from the lower channel section. Both the lower channel section and upper channel section are preferably made of a stock steel channel having a longitudinal center web portion with angularly outwardly divergent side walls and equally spaced apart holes along the entire length of the web, as described previously. The design of the channel sections is such that when one channel section is nested within the other, there exists a space of a predetermined distance defined between the center web portions of the channel sections, while the respective tapered side walls of the channel sections are in close contact with one another.

In the invention, the upper and lower channel sections are connected together with a spacer and fastener combination, with the spacer positioned or sandwiched between the nested portions of the channel sections. Specifically, the spacer provides a number of functions during the assembly and operation of the sign post, as described hereinafter.

During assembly, the lower channel section is driven into the ground or embedded in a substrate such that only an upper end portion is exposed above the surface of the ground or substrate. A plurality of spacers, preferably two, are attached to the web of the lower channel section in spaced relationship to one another by suitable fasteners, and the upper channel section is then secured on the fasteners and against the spacers, whereby the webs of the respective channel sections engage on opposite sides of the spacer, and the angularly divergent side walls make contact with one another. The spacers serve initially to hold the fasteners in place on the web of the lower section, thereby facilitating positioning of the upper section on the fasteners, and completion of the assembly process by nuts or the like placed on the fasteners. A single workman can quite easily accomplish the installation, unassisted by others, if necessary or desired.

In one embodiment, the spacers have a central threaded opening therethrough, and during assembly each spacer is threaded onto a respective headed bolt passed through a hole in the web of the lower channel section. The spacers are threaded onto the bolts until they tightly contact with the surface of the web on the side opposite to the head of the bolt, thereby securely attaching the fastener (bolt) to the channel section. Thereafter, the upper channel section is placed over the exposed ends of the previously secured bolts, and fasteners such as nuts or the like are placed on the exposed ends to firmly attach the upper and lower sections together, with the spacers sandwiched between the webs of the respective channel sections.

In another embodiment of the invention, the spacer may be fabricated with a threaded fastener extending from opposite sides thereof. In this form of the invention, one threaded fastener end is inserted through a hole in the web of the lower channel section, and a washer and nut are secured on the end extending on the side of the web opposite the spacer, whereby the spacer is in firm contact with the web of the lower channel section. Thereafter, the upper channel section is positioned on the other threaded fastener, with its web in contact with the other side of the spacer, and the divergent side walls of the respective channel sections in engagement with one another. A washer and nut are then threaded onto this faster to secure the upper channel section against the spacer and to the lower channel section. The channel sections include a pair of substantially flat flange portions extending in coplanar relationship to one another from the outer edges of the side walls, defining a flat and stable surface on which to mount the sign.

The combination of the spacers and fasteners greatly ease the assembly of the of the sign post according to the present invention. Further, the spacers prevent the fasteners from being overtightened, as might be effected in the absence of the spacers. Specifically, when the spacer is not provided to take up the space between the webs of the nested end portions of the channel sections, there is a tendency to overtighten the bolts and impose stresses and/or deformation in the components. This tendency occurs due to the lack of a positive mounting surface between the nested end portions of the channel sections at the point where the bolts pass through the channel sections.

Additionally, the spacer functions as a fulcrum when the sign post is struck, causing the fasteners to be subjected to particular kinds of loads and resulting in failure of the fasteners in a predetermined and predictable way.

The breakaway connection of the present invention not only provides a joint that fails in a predictable way, but also results in a joint that is stronger than either of the individual channel sections, particularly with reference to yield stress (80-100 ksi yield stress). This is important because the sign post must support a sign over a period of time during various wind and weather conditions. In other words, strength and durability are equally as important as the breakaway feature. The joint of the invention can withstand the same or even more yield stress than the stock channel material utilized in making the sign post, unlike most other sign posts having a breakaway joint and utilizing a similar stock channel material.

BRIEF DESCRIPTION OF THE DRAWINGS

Referring to the drawings, wherein like reference characters refer to like parts throughout the several views, and wherein:

FIG. 1 is a perspective view of an embodiment of the present invention;

FIG. 2 is a transverse cross-sectional view of the sign post shown in FIG. 1, taken at a point where the upper and lower sections of the of the sign post are nested together;

FIG. 3 is a perspective view of a preferred embodiment of the spacer according to the present invention; and FIG. 4 is a perspective view of a further embodiment of the spacer according to the present invention.

DETAILED DESCRIPTION OF THE PREFERRED EMBODIMENTS

A perspective view of a preferred embodiment of the sign post 10 according to the present invention is shown in FIG. 1. The sign post 10 comprises a lower channel section 11 embedded in the ground G, or other substrate, and an upper channel section 12 joined to the lower channel section at a frangible joint or splice 13. Each of the channel sections comprise stock material, and have a generally hat-shaped transverse cross-section with a flat, longitudinally extending center web 14 and angularly outwardly divergent side walls 15 and 16 along opposite sides.

The lower channel section 11 includes an exposed upper end portion 17 nested together with a lower end portion 18 of the upper channel section 12, as shown in FIG. 2. Preferably, the end portion 17 of the lower channel section 11 is nested within the end portion is of the upper channel section 12, as shown in FIGS. 1 and 2, although these relative positions could be reversed. However, the nested relationship shown promotes the predictable behavior of the joint, since the section that will be bent or torn away is on the back side of the support (lower channel section 11).

The nested end portions of the channel sections are securely fastened together by suitable fastening means which break under a specific load or range of load. For example, the fastening means can be a bolt 20 having a head 22 and threaded shank 23 cooperating with a nut 24. Washers 26 can be provided for spreading the load from the fastener into the channel sections. Because of the size and shape of the channel sections, the webs of the respective channel sections normally remain spaced from one another when the divergent side walls come into contact, leaving a space or distance D between the webs.

In accordance with the invention, a spacer 28 is engaged in this space between the webs 14 of the channel sections 11 and 12, and the spacer 28 has a width or thickness substantially equal to the distance D. Preferably, the spacer 28 is essentially washer-shaped and has substantially flat bearing surfaces 34 and 36 set parallel to each other.

Alternatively, the spacer can be designed in a variety of shapes as long as its thickness is approximately equal to the distance D.

The spacer is shown in greater detail in FIG. 3, and has a threaded hole 38 through its center. During installation, the threaded end of bolt 20 is passed through a hole in the web of the lower channel section, and the spacer 28 is then threaded onto the bolt and against the web of the channel section, on the side of the web opposite to the head of the bolt. Consequently, the bolt and spacer are securely held in position on the lower channel section, with the threaded end of the bolt projecting beyond the spacer. The upper channel section is then placed in position, with the threaded end of the bolt extending through an aligned hole in the web of the upper channel section. Thereafter, a washer and nut are threaded onto the threaded end of the bolt to secure the upper and lower channel sections together on opposite sides of the spacer.

An alternative embodiment of the spacer is shown at 40 in FIG. 4. In this embodiment, the spacer 40 is fabricated with threaded bolt portions 41 and 42 extending perpindicularly from opposite sides of the spacer 40. When installing a sign post using this form of the invention, one of the threaded bolt portions 41 or 42 is passed through a hole in the web of the lower channel section, and secured with the spacer 40 held against the web by threading a nut 43 onto the bolt portion. The upper channel section is then positioned over the other bolt portion 41 or 42 and secured in place with a washer and nut 44.

Outwardly extending, coplanar side flanges 46 and 47 extend from the free edges of the side walls and define a flat mounting surface on which to mount the sign 50. The sign 50 is mounted on the sign post 10 by means of one or more fasteners, such as bolts 51 as shown in FIG. 1.

Preferably, the stock steel channel material has a high carbon content so as to be relatively brittle. Specifically, the lower and upper channel sections are made of material with a yield stress of 80-100 ksi, generally conforming to ASTM A499 (rerolled rail steel), but made from new billets. The bolts are preferably Grade 9 and are 5/16 inch in diameter, with Grade 9 washers.

When the sign post of the present invention is assembled, as shown in FIG. 1, the end portion 17 of the channel section 11 nests within the end portion 18 of the channel section 12. In this nested arrangement, the outer surfaces 52 of the tapered side walls 15 and 16 on the lower channel section engage with the inner surfaces 54 of the tapered side walls of the upper channel section 12, and the spacer 28 or 40 is engaged between the webs of the respective channel sections.

The steel channel preferably utilized to construct the sign post according to the present invention includes a plurality of equally spaced apart holes 56 along the entire length of the stock material. In the assembled sign post, one or more fasteners can be utilized to secure the upper and lower channel sections together. For instance, in the embodiment shown in FIG. 1, two (2) bolts 20 spaced four inches apart, each in combination with a set of washers 26, a spacer 28 and a nut 24, are utilized to join the channel sections 11 and 12 together.

As a further alternative, the end portions of the channel sections may have the same cross-sectional profile and size as in the embodiment shown in FIGS. 1 and 2 to form the breakaway joint. However, the remaining portions of one or both channel sections can have a different cross-sectional profile and/or shape. For example, the lower channel section could be the same as shown in FIG. 1, and the upper channel section made of square tubular stock material welded or formed with an end portion the same as shown in FIG. 2 to form the same type of connection between the upper and lower sections.

ASSEMBLY

The embodiment of the sign post 10 shown in FIG. 1 is preferably assembled as follows. The lower channel section 11 is driven into the ground with a sledge hammer or other pile driving device. A steel outer protective cap (not shown) may be slid over an upper portion of this channel section during the driving operation to prevent damage to the channel section upon being repeatedly struck with the sledge hammer or other driving implement. The lower channel section is driven into the ground until approximately five (5) inches remain above the surface of the ground.

Subsequently, the bolts 20 are positioned through a set of holes in the lower channel section 11, spaced four inches apart, and then a threaded spacer 28 of the type shown in FIG. 3 is threaded onto each bolt 20 on the side of the lower channel section web opposite to that on which the head 22 of the bolt is engaged. The spacers are screwed on until they are in tight contact with the surface of the flat center web of the lower channel section 11.

After the sign 50 is mounted to an upper end of the upper channel section 12 with fasteners 51, the end portion 18 of the upper channel section 12 is positioned on the exposed threaded ends of the bolts 20 extending beyond the spacer mounted on the lower channel section 11. The bolts support the upper channel section with sufficient stability to enable a person assembling the sign post to place a washer and nut onto each bolt with one hand while the other hand supports the upper channel section to keep it from falling over. The nuts are subsequently tightened to a set torque limit. In addition, locking washers can be used in combination with the bolt fasteners to prevent loosening of the nuts over a period of time.

OPERATION

If a motor vehicle collides with the sign post according to the present invention, the point of impact will generally be on the upper channel section 12. This is due to the exposed portion of the lower channel section 11 being low enough in height to clear the bottom of the vehicle. Thus, the lower channel section is rarely disturbed during the initial impact.

Assuming that the motor vehicle strikes the sign post 10 in a direction substantially perpindicular to the plane of the web, and from the front side of the sign, an upper portion of the upper channel section will initially be driven backwardly with the base of the sign post beginning to act as a hinge. If the impact is of a lower impact variety, the sign post will continue to hinge over at its base until the vehicle completely runs over the sign post. In higher impact collisions, the upper channel section of the post will tend to be captured by the vehicle somewhat due to deformation of the channel section. In this case, a sufficient force will be exerted on the bolts to cause failure and breaking away of the upper channel section 11 from the lower channel section 12.

More specifically, during the initial stages of the impact, the lower bolt and spacer act as a fulcrum, resulting in almost a pure tensile force in the upper bolt and causing breakage of the upper bolt. Subsequently, the lower bolt is subjected to mostly shear forces due to the edge at the outer periphery of the spacer acting as a fulcrum, providing a moment arm of length L.

The sign post according to the present invention can be tailored to break away when the impact force is above a certain limit. The actual force necessary will depend on the height at which the upper channel is impacted, dictating the length of the moment arm at the bolted connection, and also depending on the angle at which the vehicle impacts with the sign post, and the material from which the components are made.

The sign post can be tailored by selecting a number of system variables, such as the bolt thickness (tensile force), spacer diameter (moment arm), spacer thickness, cross-sectional shape of the spacer with respect to the connection between the channel sections, material, etc.. The particular breakaway system employed in the sign post of the present invention theoretically ensures breakage of the connection consistently above a limited range of impact force, providing reliability of functioning of the breakaway connection to ensure safety. This consistency is achieved due to the limited number of the above-identified variables that can be accurately controlled.

TEST RESULTS

The following are the test results of a Texas Transportation Institute study entitled "Small Sign Support Analysis", conducted under the Arizona DOT Research Project HPR-PL-1-31(202).

Material Specification

Posts (upper channel section) and stubs (lower channel section): 80-100 ksi yield stress, generally conforming to ASTM A499 (rerolled rail steel), but made from new billets.
Bolts: Grade 9, 5/16" diameter.
Washers: Grade 9

Splice Dimensions

Nested splice five to six inches in length, fastened with two (2) bolts four inches apart, with washers and spacer, as shown in FIG. 2.

In these tests, as in the intended use of the invention, the spacer inserted between the channel sections prevents the post (upper channel section) and stub (lower channel section) from being distorted as the splice bolts are tightened. The spacer had a width or thickness 1/16 inch less than the distance D between the posts when they are laid in the nested configuration. The spacer widths used in the tests were as follows:

| Post Size (#/ft) | Spacer Length (inches) |
|---|---|
| 2 | ¼ |
| 2¼ | 5/16 |
| 2¾ | ¼ |
| 3 | ¼ |
| 4 | ¼ |

Test Installation

Sign panels made from plywood eight (8) feet wide, seven (7) feet high and 5/8 inch thick were mounted on three (3) posts spaced at 3 feet-7 inches, center-to-center. The bottom of the sign mounting was five (5) feet from the ground. The stub post (lower channel section), as tested, was 42 inches long and was driven 36 inches into strong soil. For use on Federal Highway projects, the stub should be driven to leave only a 4-inch height above the ground.

The full-scale crash testing phase included four tests using triple post supports, and impacting them with 1,800-pound cars. The results of those four tests are as follows:

| Test No. | Post Size #/ft. Installed | Impact Speed | Vehicle Change in Velocity | Occupant Impact Speed | Occupant Ridedown Accel. |
|---|---|---|---|---|---|
| 7024-24 | 4 lbs/ft | 20.6 mph | 28.0 fps | 21.9 fps | 2.7 g |
| 7024-25 | 4 lbs/ft | 62.6 mph | 13.2 fps | 13.2 fps | 0.6 g |
| 7024-26 | 3 lbs/ft | 21.7 mph | 12.6 fps | 12.5 fps | 0.5 g |
| 7024-27 | 3 lbs/ft | 61.6 mph | 9.1 fps | no contact | no contact |

Test 7024-24 did not meet the FHWA requirements for breakaway supports. After an analysis of the energy expended during that test, however, the FHWA did allow the use of two 4 pound-per-foot posts within a 7-foot span. Tests of the 3 pound-per-foot posts did meet breakaway requirements for change in velocity. Therefore, triple post installations in sizes from 2 to 3 pounds/foot were deemed acceptable.

While the invention has been shown and described in detail, it is obvious that this invention is not to be considered as being limited to the exact form disclosed, and that changes in detail and construction may be made therein within the scope of the invention, without departing from the spirit thereof.

What is claimed is:

1. A sign post, comprising:
   a lower channel section to be anchored in a substrate, said lower channel section having an upper portion;
   an upper channel section extending upwardly from said lower channel section and having a lower portion nested with said upper portion of said lower channel section, said channel sections being configured in cross-sectional shape so as to have surfaces separated by a predetermined distance and other surfaces in contact when said channel sections are nested together;
   at least one fastener coupling said channel sections together; and
   a spacer positioned between said separated surfaces of said channel sections, at said fastener location, said spacer having a thickness approximately equal to said predetermined distance between said separated surfaces of said nested channel sections and preventing overstressing and distortion of the channel sections during assembly, said spacer further defining fulcrum means to concentrate force and facilitate consistent and predictable breakage of the fastener upon impact of a vehicle with the sign post.

2. A sign post according to claim 1, wherein said spacer is washer- or disc-shaped.

3. A sign post according to claim 1, wherein said spacer has opposite, parallel bearing surfaces for engagement between said channel sections, and includes threaded bolt portions extending perpindicularly from said opposite sides.

4. A sign post according to claim 1, wherein said channel sections have hat-shaped transverse cross-sections.

5. A sign post according to claim 4, wherein said separated surfaces comprise substantially flat center web portions of said channel sections, said web portions positioned substantially parallel to each other when said channel sections are nested together and being spaced apart; and said other, contacting surfaces comprise tapered side walls at opposite sides of the web portion, said side walls being in contact with each other when said channel sections are nested together.

6. A sign post according to claim 5, wherein said flat center web portions of said channel sections are provided with a plurality of equally spaced apart holes for accommodating bolt fasteners.

7. A sign post according to claim 6, wherein said fastener is a bolt-type fastener; and said spacer is provided with a hole to accommodate the bolt-type fastener, said bolt-type fastener passing through aligned holes in said separated surfaces of said channel sections and said spacer for connecting said channel sections together with the spacer sandwiched therebetween.

8. A sign post according to claim 1, wherein said fastener comprises an elongate member extended through aligned openings in the web portions of the channel sections; and said spacer has a hole through which said fastener is received.

9. A sign post according to claim 8, wherein said spacer is washer- or disc-shaped.

10. A sign post according to claim 8, wherein said spacer is configured to connect with said fastener.

11. A sign post according to claim 8, wherein said fastener includes a bolt, and the hole of said spacer is threaded and of a diameter and thread type to allow the spacer to be threaded onto said bolt.

12. A sign post according to claim 11, wherein said spacer is washer- or disc-shaped.

13. A sign post according to claim 11, wherein said fastener includes a nut threaded on said bolt.

14. A sign post according to claim 13, wherein said fastener includes at least one washer positioned on said bolt between the channel section and nut.

15. A sign post, comprising:

a lower channel section having a hat-shaped cross-section and adapted to be anchored in a substrate, said lower channel section including an upper portion for exposure above the substrate;

an upper channel section having a hat-shaped cross-section, said upper channel section extending axially upwardly from said lower channel section and having a lower portion nested with said upper portion of said lower channel section, said channel sections being configured in cross-sectional shape so as to have parallel surfaces separated by a predetermined distance and other tapered surfaces in contact when said channel sections are nested together;

a fastener coupling said channel sections together; and a spacer positioned between said separated parallel surfaces of said channel sections at said fastener location, said spacer having a predetermined thickness approximately equal to said predetermined distance between said separated surfaces of said nested channel sections.

16. A sign post according to claim 15, wherein said separated surfaces are substantially flat, longitudinally extending web portions having a plurality of holes spaced apart along the length thereof.

17. A sign post according to claim 15, wherein said fastener is a bolt-type fastener, and said spacer is provided with a hole to accommodate said bolt-type fastener, said bolt-type fastener passing through aligned holes in said separated surfaces of said channel section and said spacer.

* * * * *